Oct. 8, 1968     J. A. SPISAK     3,404,551

ULTRASONIC GAUGING AND CONTROL

Filed May 12, 1966     2 Sheets-Sheet 1

INVENTOR.
JOHN A. SPISAK

BY Brumbaugh, Free, Graves & Donohue his ATTORNEYS

Oct. 8, 1968  J. A. SPISAK  3,404,551
ULTRASONIC GAUGING AND CONTROL
Filed May 12, 1966  2 Sheets-Sheet 2
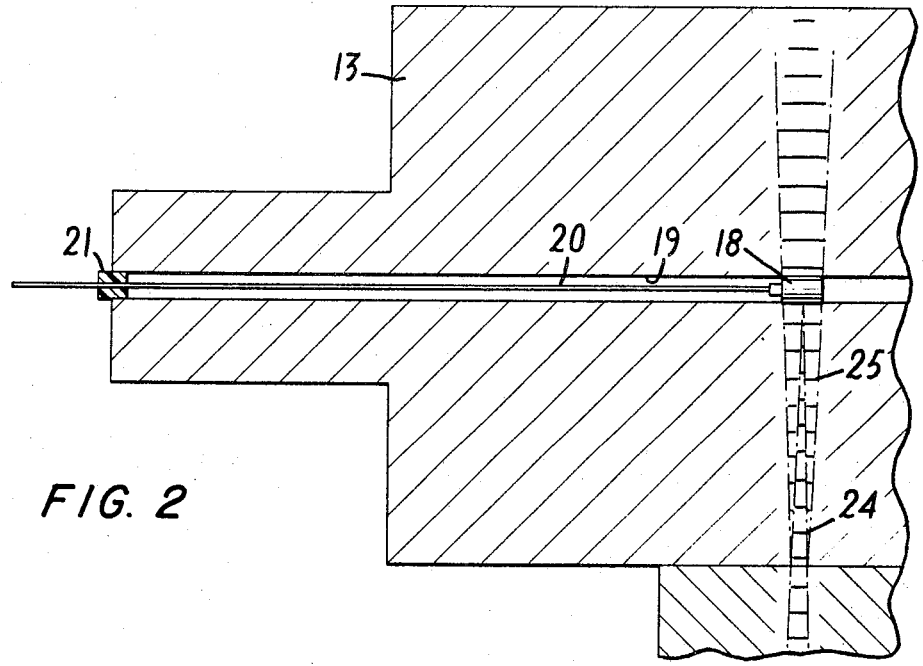
FIG. 2
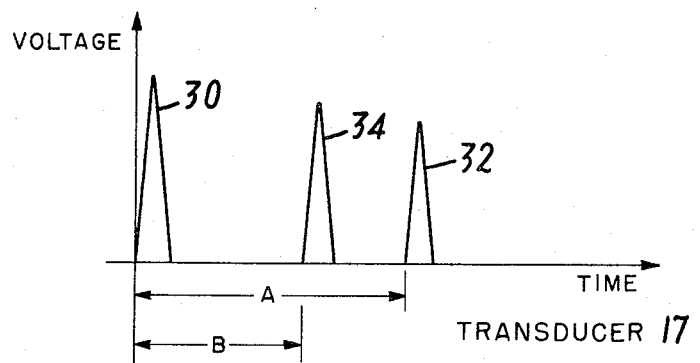
FIG. 4
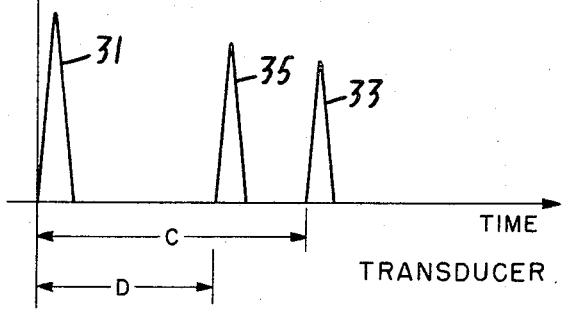
INVENTOR.
JOHN A. SPISAK
BY
Brumbaugh, Free, Graves & Donohue
his ATTORNEYS

# United States Patent Office 3,404,551
Patented Oct. 8, 1968

3,404,551
ULTRASONIC GAUGING AND CONTROL
John A. Spisak, New London, Conn., assignor to General Dynamics Corporation, New York, N.Y., a corporation of Delaware
Filed May 12, 1966, Ser. No. 549,553
3 Claims. (Cl. 72—16)

ABSTRACT OF THE DISCLOSURE

The invention provides transducers in opposing working rolls of a metal rolling mill. Ultrasonic signals are transmitted from each transducer through the rolls and strip to the other. The time of transmission from one transducer to the other and the average of the times of reflection off of the surface of each roll are calculated and the thickness of the metal strip determined by subtraction of one from the other.

---

This invention relates to systems for determining the gauge of a material being rolled in a rolling mill and, more particularly, to a new and improved system for determining gauge by detecting the separation between the working rolls of the mill during rolling of the material.

Heretofore, it has not been feasible to measure directly the thickness of a strip or sheet of steel which may be at a temperature of 2,000° F., for example, at the time it is rolled in a rolling mill stand. Instead, the thickness of a material being rolled has been determined indirectly such as by measuring the preset roll gap and computing the change resulting from deflection of the stand as the material passes through it. In this case, the stand is adjusted in accordance with the computed deflection to provide the desired gap between the working rolls. Another method of gauge control requires the measurement of thickness before and after the material passes through the stand and adjustment of the force constrained in the stand in accordance with measured parameters, such as the temperature, tension and hardness of the material. All present systems of this type suffer from the disadvantages inherent in linearization of nonlinear functions by limiting the operating range over small perturbations about a fixed set of conditions.

Accordingly, it is an object of the present invention to provide a new and improved system for determining the thickness of a material being rolled at the time of rolling.

Another object of the invention is to provide a new and improved system for measuring accurately the separation of the working rolls of a rolling mill stand during operation.

These and other objects of the invention are accomplished by transmitting ultrasonic signals from corresponding transducers through each working roll and the material being rolled and through the opposite working roll and detecting at each working roll transducer the signals reflected from the interface between that working roll and the material being rolled, as well as the signals transmitted through the material from the other working roll. By subtracting a value corresponding to half the time required for the two reflected signals to be returned to the respective transducer from a value corresponding to the total transit time for signals passing from one transducer to the other, a highly accurate measure of the working roll separation and, therefore, the gauge of the material being rolled is obtained.

Further objects and advantages of the invention will be apparent from a reading of the following description in conjunction with the accompanying drawings in which:

FIG. 2 is an enlarged fragmentary view in longitudinal section taken along the line 2—2 of FIG. 1 and illustrating the arrangement of the transducer within the working roll;

FIG. 4 is a graphical representation illustrating the manner of operation of the roll separation detector of the invention.

Figure 1:
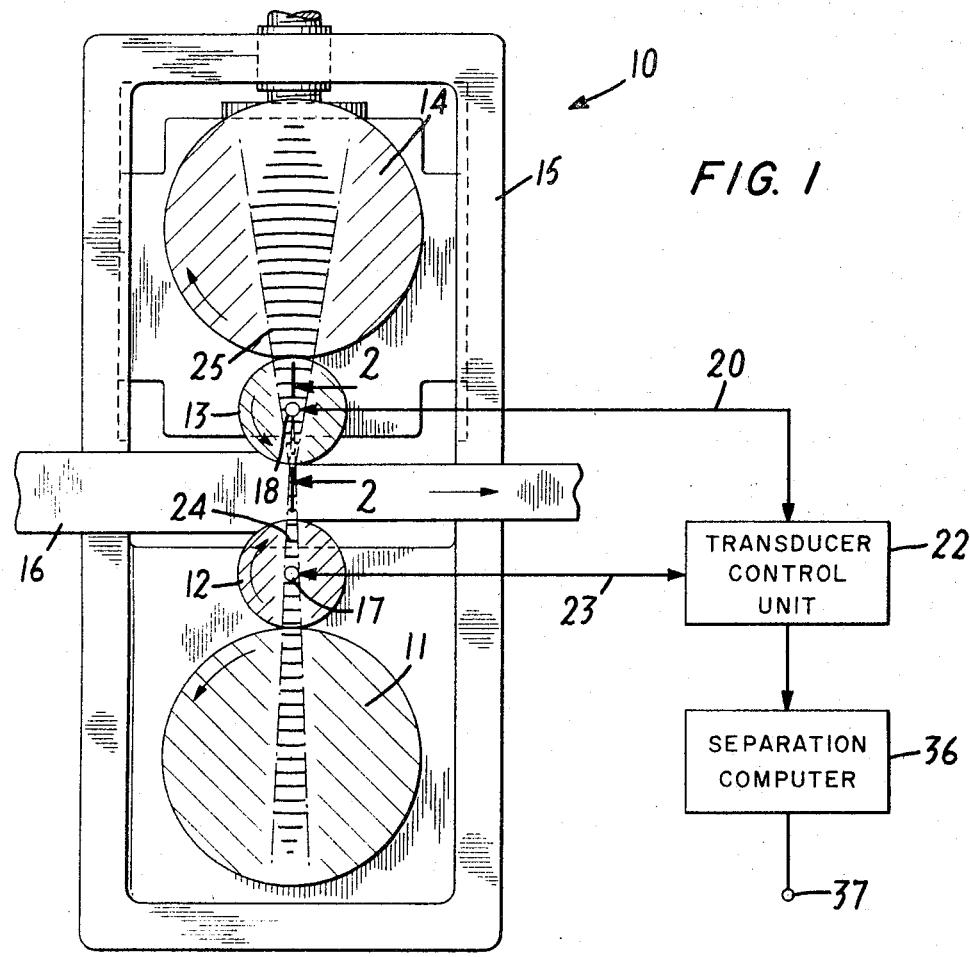
FIG. 1 is a view in vertical section illustrating schematically the arrangement of a representative mill stand utilizing the detecting system according to the invention and showing the operation of the ultrasonic transducer in one working roll.
Figure 3:
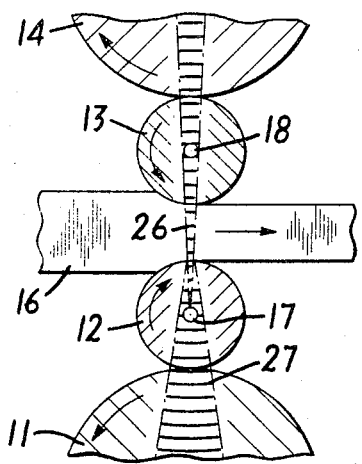
FIG. 3 is an enlarged fragmentary view of the apparatus of FIG. 1 illustrating the operation of a transducer in the other working roll.

In the typical rolling mill system illustrated in FIGS. 1–3, a rolling mill stand 10 includes a lower backup roll 11, a lower working roll 12, an upper working roll 13 and an upper backup roll 14, supported in vertical alignment in the usual manner within a frame 15. A strip 16 of metal to be reduced in thickness passes between the working rolls 12 and 13, the lower backup roll 11 being driven by a drive motor (not shown) and the upper backup roll 14 being connected to the frame 15 through a screw-down or gap-adjusting mechanism (not shown) in the usual manner.

Two electroacoustic transducers 17 and 18 disposed within the working rolls 12 and 13, respectively, are, as best seen in the enlarged view of FIG. 2, mounted within a central bore 19 in each working roll. A cable 20, extending through a bearing mount 21 at the end of the working roll, connects the transducer 18 to a transducer control unit 22 as shown in FIG. 1 and the transducer 17 in the other working roll is similarly connected to the unit 22 through a cable 23. Each transducer may comprise, for example, a block of conventional piezoelectric or other electrostrictive material adapted to convert electric signals into ultrasonic signals and vice versa.

In the arrangement illustrated in FIG. 2, the transducer is affixed to and turns with the working roll in which it is mounted but is designed to direct ultrasonic energy in a selected angular direction and to detect ultrasonic energy received from that direction. Consequently, the transducer is preferably rendered operative by the control unit 22 only when the working roll in which it is mounted is turned so as to direct it toward the material being rolled and toward the transducer mounted in the central bore of the other working roll. Multiple transducers may also be fixedly mounted in the roll bore circumference. By commutation and synchronization, multiple samples of strip thickness can be taken per work roll revolution. If desired, however, each transducer may be mounted in a fixed position with respect to the working roll bearing chock (not shown) so that it is permanently oriented in the proper direction and the working roll rotates about it. In that case, the operation of the transducer need not be synchronized with the rotation of the working roll and, moreover, if the transducer is spaced from the wall of the central bore 19 to utilize focusing techniques, the bore should be filled with a substantial quantity of an acoustic coupling agent, such as oil or grease.

In accordance with the invention, the transducer control unit 22 is arranged in any conventional manner to energize both of the transducers 17 and 18 simultaneously to produce ultrasonic pulses of very short duration, lasting, for example, a few microseconds. Thereafter, the control unit detects electric signals produced in the transducers by the action of the ultrasonic waves reflected from the interface between the working roll and material being rolled and from the ultrasonic wave transmitted through the strip from the other transducer. The illustrated wave 24 in FIGS. 1 and 2 shows the path and the manner of divergence of the wave generated within the working roll 13 by the transducer 18 and the wave designated 25 illustrates the reflection of the wave 24 toward the transducer 18. Inasmuch as the reflected wave loses energy quite rapidly by reason of its attenuation, the signals resulting from ultrasonic waves reflected from other interfaces or repeatedly reflected within the working roll are so small that they do not interfere with detection of the transmitted wave and the primary reflected wave.

FIG. 3 illustrates the manner of operation of the other transducer 17. In this case, the ultrasonic wave 26 is directed toward the transducer 18 and a reflected wave 27 from the interface between the working roll and the material is reflected back toward the transducer 17. As shown in FIG. 3, these waves spread angularly in the same manner as in FIG. 1 so that subsequent interreflections are not effective to produce signals which would interfere with the measurement. Although the transducers 17 and 18 are illustrated in FIGS. 1 and 3 as being separately actuated, it will be understood that, in general, these transducers are energized to produce ultrasonic pulses simultaneously so that all of the information which is necessary for an accurate determination of the working roll separation is obtained at the same time.

In the graphical representation of FIG. 4, the ultrasonic signal generated by the transducer 17 is represented by the pulse shape 30 in the upper portion of the figure and that produced by the transducer 18 is shown by the pulse shape 31 in the lower portion. Following a time interval A after initiation of these pulses, the transducer 17 detects a pulse 32 which corresponds to the pulse 31 generated by the transducer 18 after it has been transmitted through the radius of each working roll and the intervening strip of material 16. Similarly, the transducer 18 detects a pulse 33 after a time interval C corresponding to the transmitted ultrasonic pulse from the transducer 17 and, in normal circumstances, the intervals A and C will be identical. It will be readily apparent that the interval A or C is proportional to the distance between the two transducers, i.e., the radii of the two working rolls added to the separation between the working roll surfaces and the latter is an accurate measure of the gauge of the material being rolled. Inasmuch as the working rolls are deflected and deformed during operation, however, the radii of the rolls as measured in the static condition cannot be utilized to determine the working roll separation accurately. Furthermore, any external measurement taken during operation of the mill incorporate errors resulting from stand elasticity, bearing play, screw backlash, etc.

Because the pulses 30 and 31 generated by the transducers 17 and 18 are also reflected back from the interface between the strip 16 and the corresponding working roll, as indicated in FIGS. 1 and 3, the time of arrival of the reflected pulses provides a highly accurate measure of the effective working roll radius or the distance from the transducer to the interface at the same time that the pulse transmission time interval measurement is made. These reflected waves are illustrated in FIG. 4 by the pulses 34 and 35 for the transducers 17 and 18, respectively, the time intervals from pulse initiation being designated B and D, respectively.

Even though the working rolls may, under no load conditions, have the same effective radius or distance from transducer to roll surface, because of differences in the manner of deformation of the rolls, they may not have the same effective radius under load. This is illustrated in FIG. 4 by a slight difference between the intervals B and D. Consequently, a significant error in roll separation measurement which could result from assuming identical effective radii and measuring only one radius or calculating an expected effective radius of the working rolls is avoided by utilizing both of the measurements B and D in the roll separation computation.

With the information represented by the illustration in FIG. 4, the working roll separation may be readily determined by subtracting half the time interval B and half the time interval D, or, in other words, the average of B and D, from the interval A or C which should be identical, or from the average of A and C if there is any difference between them. The result of this operation is multiplied by a factor representing the velocity of ultrasonic waves in the material 16 and in the working rolls to obtain the roll separation. If the velocity of ultrasonic waves in the material 16 is different from the velocity in the working rolls, the values B and D are multiplied by the appropriate factors in the working rolls and the value A is multiplied by a factor corresponding to the relative proportions of the path within the working rolls and within the material in the gap between them.

The foregoing computation is carried out by a separation computer 36 which, as shown in FIG. 1, receives information relating to the intervals A, B, C and D from the control unit 22 and carries out the computation in any conventional manner producing a signal corresponding to the roll separation at an output 37. This signal may be utilized in any desired manner to control the operation of the mill stand 10 so as to maintain the gauge of the strip 16 within desired limits.

In operation, therefore, as the material 16 passes between the rolls 12 and 13 and is reduced in thickness thereby, the transducers 17 and 18 are simultaneously energized from the control unit 22 to produce short pulses of ultrasonic energy. Thereafter, the transducers act as receivers and the time of transmission of the pulses from each transducer to the other and of reflection from the nearest interface back to the same transducer is detected by the control unit 22. This information is, in turn, provided to the computer 36 which operates in the manner described above to produce a signal representing the separation of the working roll surfaces.

Although the invention has been described herein with reference to a specific embodiment, many modifications and variations therein will readily occur to those skilled in the art. Accordingly, all such variations and modifications are included within the intended scope of the invention as defined by the following claims.

I claim:

1. A method for determining the separation between the working rolls in a rolling mill during operation comprising transmitting ultrasonic signals from transducers disposed within each working roll in a direction toward the other working roll, detecting the time interval required for an ultrasonic signal to be transmitted from one transducer to the other, detecting the time interval required for each ultrasonic signal to be reflected back to the corresponding transducer from the surface of the working roll adjacent to the other working roll, and subtracting a value corresponding ot the average of the two reflected signal time intervals from a value corresponding ot the transmitted signal time interval.

2. A method according to claim 1 including the steps of multiplying each reflected signal time interval by a factor corresponding to the velocity of ultrasonic signals in the working rolls, and multiplying the transmitted signal time interval by a velocity factor dependent upon the relative path lengths of the signal through the working rolls and the separation between the working rolls.

3. Apparatus for determining the separation between the working rolls of a rolling mill during operation comprising a mill stand including a pair of working rolls each provided with a central bore, ultrasonic transducer means disposed at corresponding locations within the bores of both working rolls for directing ultrasonic signals toward the other working roll, transducer control means electrically connected to both transducer means to induce ultrasonic signals therein toward each other and to respond to signals reflected from the surfaces of each roll opposite each other and to signals from the other transducer, and computer means responsive to the transducer control means for subtracting an average of values representing the time intervals for reflection of signals from the surfaces of the working rolls from a value representing the time interval of transmission of signals between the transducer means.

References Cited

UNITED STATES PATENTS

| | | | |
|---|---|---|---|
| 2,640,190 | 5/1953 | Rines | 73—67.7 |
| 2,661,714 | 12/1953 | Greenwood et al. | 73—67.8 |
| 2,862,384 | 12/1958 | Renaut | 73—67.6 |
| 3,006,184 | 10/1961 | Goldman | 73—67.8 |
| 3,074,267 | 1/1963 | Martin | 73—67.5 |
| 3,117,276 | 1/1964 | Beyer et al. | 73—67.7 |
| 3,315,520 | 4/1967 | Carnevale et al. | 73—67.5 |

CHARLES W. LANHAM, *Primary Examiner.*

A. RUDERMAN, *Assistant Examiner.*